United States Patent [19]

Lauritzen et al.

[11] Patent Number: 5,344,182
[45] Date of Patent: Sep. 6, 1994

[54] AIR BAG RETENTION IN INFLATABLE RESTRAINT SYSTEMS

[75] Inventors: Donald R. Lauritzen, Hyrum; Larry D. Rose, Layton, both of Utah

[73] Assignee: Morton International, Inc., Chicago, Ill.

[21] Appl. No.: 993,280

[22] Filed: Dec. 18, 1992

Related U.S. Application Data

[63] Continuation-in-part of Ser. No. 840,238, Feb. 24, 1992.

[51] Int. Cl.⁵ ............................................. B60R 21/16
[52] U.S. Cl. .................... 280/728 A; 248/101; 220/404
[58] Field of Search ........... 280/728 R, 728 A, 728 B, 280/732, 743 R; 383/3, 33; 220/404; 248/101, 99, 397; 403/391, 396

[56] References Cited

U.S. PATENT DOCUMENTS

| | | | |
|---|---|---|---|
| 3,778,085 | 12/1973 | Lipkin | 280/734 |
| 3,916,962 | 11/1975 | Stolt | 248/101 |
| 4,111,457 | 9/1978 | Kob et al. | 280/728 |
| 4,135,634 | 1/1979 | Frye | 220/404 |
| 4,721,317 | 1/1988 | Avot | 248/101 |
| 4,738,478 | 4/1988 | Bean, Jr. | 248/101 |
| 4,877,264 | 10/1989 | Cuevas | 280/731 |
| 4,941,678 | 7/1990 | Lauritzen et al. | 280/732 |
| 4,986,569 | 1/1991 | Bruton | 280/743 |
| 5,058,919 | 10/1991 | Paquette et al. | 280/732 |
| 5,069,480 | 12/1991 | Good | 280/743 |
| 5,209,442 | 5/1993 | Buck et al. | 248/99 |
| 5,259,643 | 11/1993 | Kraft et al. | 280/741 |
| 5,263,739 | 11/1993 | Webber et al. | 280/732 |

FOREIGN PATENT DOCUMENTS 382552 8/1990 European Pat. Off. ............ 280/736

Primary Examiner—Karin L. Tyson
Attorney, Agent, or Firm—Nick C. Kottis; Gerald K. White

[57] ABSTRACT

An attachment system, an air bag module subassembly and a method of attachment are provided for the fastenerless attachment of an inflatable cushion into a restraint system. A thickened gas inlet opening of the inflatable cushion is secured within a channel portion of a cushion retainer to form a cushion/retainer subassembly wherein the secured inlet opening forms an attachment insert. The attachment insert is inserted into an attachment sleeve portion of the reaction housing to secure the cushion to the housing.

20 Claims, 2 Drawing Sheets

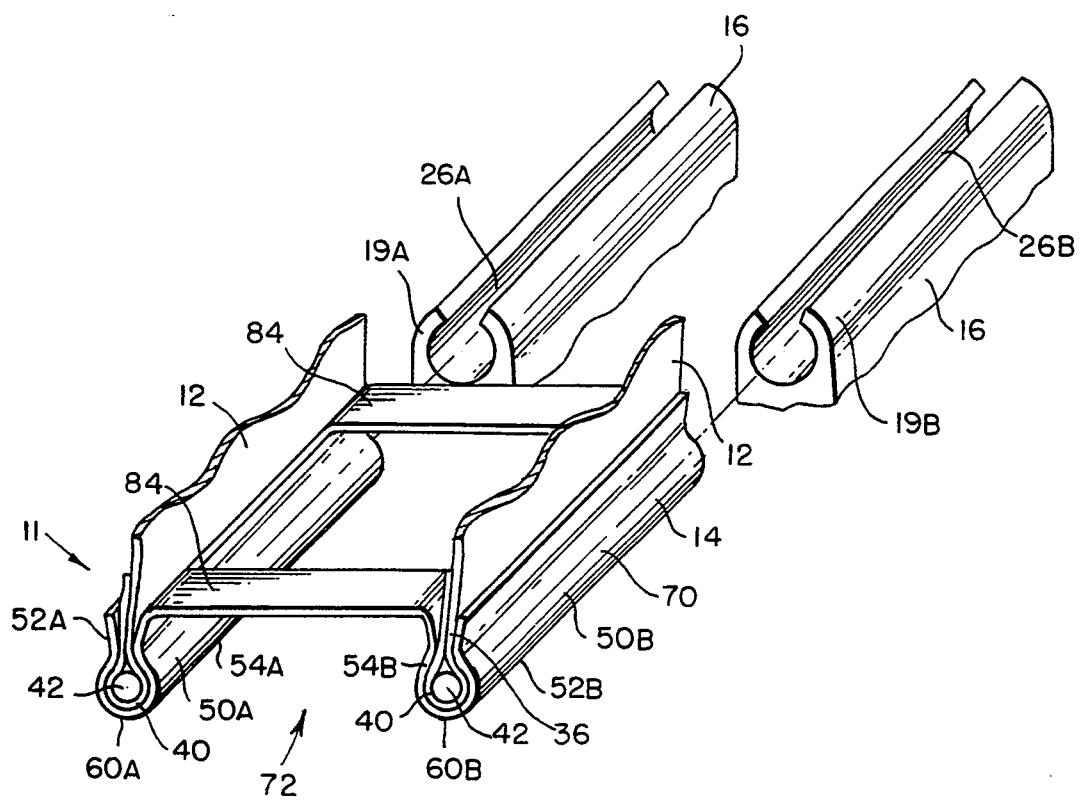
FIG. 4
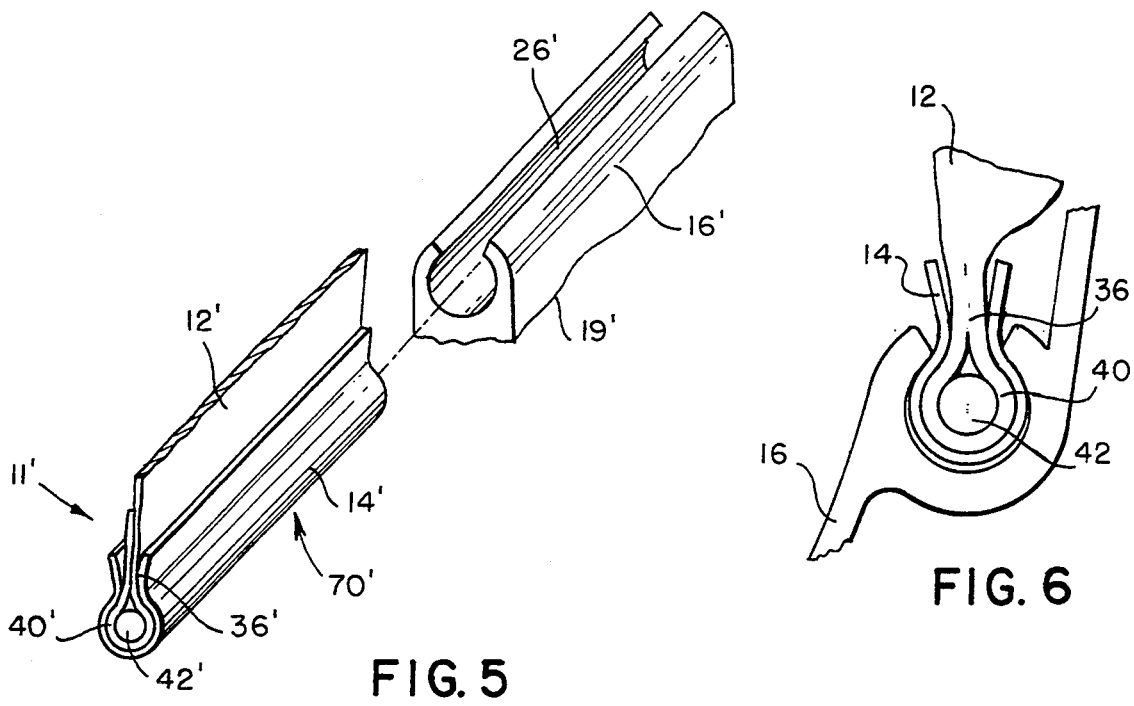
FIG. 5
FIG. 6

AIR BAG RETENTION IN INFLATABLE RESTRAINT SYSTEMS

CROSS REFERENCE TO RELATED APPLICATION

This application is a continuation-in-part application of application, U.S. Ser. No. 07/840,238 filed on Feb. 24, 1992, pending. The co-pending parent application is hereby incorporated by reference herein and is made a part hereof, including but not limited to those portions which specifically appear hereinafter.

BACKGROUND OF THE INVENTION

This invention relates generally to inflatable restraint systems and, more particularly, to the retention of an inflatable cushion, commonly referred to as an air bag, in such systems.

Safety restraint systems which self-actuate from an undeployed to a deployed state without the need for intervention by the operator, i.e., "passive restraint systems", and particularly those restraint systems incorporating inflatable bags or cushions, as well as the use of such systems in motor vehicles have been the subjects of much discussion as the desirability of the use of such passive restraint systems has gained general acceptance in the United States.

It is well known to protect a vehicle occupant using a cushion or bag that is inflated with gas, e.g., an "air bag", when the vehicle encounters sudden deceleration, such as in a collision. The term "air bag" is something of a misnomer, however, as during deployment the rapidly evolving gas with which the bag is filled is typically not air but rather an inert gas, e.g., nitrogen. In such systems, the cushion is normally housed in an uninflated and folded condition to minimize space requirements. In an emergency, gas is discharged from an inflator to rapidly inflate the bag. The cushion, upon inflation, serves to restrain the movement of the vehicle occupant as the collision proceeds. In general, such air bags are commonly designed to be inflated in no more than about 45–60 milliseconds.

Vehicular inflatable restraint systems generally include multiple crash sensors generally positioned about or mounted to the frame and/or body of the subject vehicle and serve to sense sudden decelerations by the vehicle. In turn, the sensor sends a signal to an inflatable air bag/cushion module or assembly strategically positioned within the riding compartment of the vehicle to actuate deployment of the cushion. In general, an inflatable cushion provided for the protection of a vehicle driver, i.e., a driver side air bag, is mounted in a storage compartment located in the steering column of the vehicle. Whereas, an inflatable cushion for the protection of a front seat passenger, i.e., a passenger side air bag, is typically mounted in the instrument panel/dash board of the vehicle.

Typical inflatable cushion restraint systems make use of an air bag module which generally includes an outer reaction housing or canister, commonly referred to as a "reaction can" or, more briefly, as a "can". The reaction canister generally serves to support or contain other components of the air bag module system, including what is referred to as a "air bag inflator" or, more briefly, as an "inflator" or, alternatively, as a "generator". The inflator, upon actuation, acts to provide the gas to inflate the air bag/cushion.

Inflators used in such systems are typically either of a pyrotechnic or hybrid type. Pyrotechnic inflators generally contain a gas generating material which, upon activation, generates gas used to inflate the air bag/cushion. In general, the inflation gas produced by a pyrotechnic inflator is emitted from openings or emission ports along the length of the inflator. In contrast, hybrid type inflators in addition to a body of ignitable pyrotechnic material generally contain as the primary inflation gas a stored, compressed gas which, upon proper actuation, is expelled from the inflator. As a consequence of the physics associated with the storage of compressed gases, the container used to store this compressed gas typically has a cylindrical shape. Furthermore, the discharge of gas from such a cylindrically shaped gas storage container typically occurs by way of openings or emission ports at only one end of the cylindrical container. To attain proper bag deployment, however, it is generally desired that the emission of gas into the air bag/cushion from such a storage container be done in a fairly uniform manner. With typical air bag/inflator assemblies, such uniform emission is generally attained by having a relatively even emission of gas into the deploying bag along the length of the gas inlet opening of the bag connected, directly or indirectly, to the inflator. In this way the bag is properly uniformly deployed and the risk of the bag deploying in a skewed manner due to the discharge of gas from only one end of the storage container is avoided.

The reaction housing typically is an open-mouthed container into which the air bag/cushion, in an uninflated and folded condition, is also placed. In practice and in prior art devices, the component parts of such inflatable restraining devices, particularly the inflatable air bag and the housing, are commonly joined and held together through the use of a multiple number of selected fasteners such as screws, rivets or bolts.

For example, a selected fastener is typically passed through fastener holes which have been preformed in the respective parts to be fastened together. Unfortunately, a problem frequently experienced in the assembly of these inflatable restraining units is difficulty in achieving and maintaining desired and proper fastener hole alignment of the respective parts to be fastened together. Also, in order to avoid undesired point loading of the stresses generated upon bag deployment, it is generally preferred to secure or fasten the bag into the assembly by means of fastening the bag between two load bearing materials (e.g., metals), such as between the reaction canister and metal retaining flanges or a metal ring placed about the gas inlet opening of the bag, for example. In this way, undesired loading of bag deployment stresses at or about the fastener holes in the bag fabric is reduced and preferably avoided.

In general, such fastening is done through the reaction canister itself, thereby simplifying the assembly process as the canister, bag and metal retaining flanges or metal ring are all simultaneously fastened together by means of such fastening. Unfortunately, it is difficult to simultaneously maintain proper alignment of the fastener holes in the canister, bag and retaining flange as the fastener holes in the relatively flexible bag material tend to become easily displaced relative to the fastener holes in the canister and/or retaining flange. As a result, an assembly worker must either be dedicated to maintaining the fastener holes in proper alignment or else a worker will have to stop whatever else that worker was doing in order to realign the fastener holes in the bag with the fastener holes in the canister and in the retaining flange. This of course slows and increases the cost of the assembly process. Further, a requirement for human intervention to reeffect proper fastener hole alignment prevents implementation of a more fully automated assembly process.

Furthermore, each fastener is an entity in and of itself with each such fastener needing to be tightened to a specific torque, thereby complicating the assembly process. For example in order to better ensure safety in and proper functioning of air bag module assemblies, the component parts of the assembly, including fasteners, and the particulars of each such use of a component part is desirably recorded and tracked. Such recording and tracking operations, however, are undesirably complicated as the number of component parts of the assembly is increased. In view thereof, air bag module assemblies are generally preferably designed to minimize the number of component parts used therein.

In addition, common fasteners such as screws, bolts and rivets, include a protruding head portion. Thus in systems which utilize such fastening means, the system must be designed to allow for such protrusions. In inflatable restraint systems, however, space comes at a premium and thus such systems are preferably designed seeking to minimize space requirements.

Also, fasteners, specifically portions thereof such as the protruding head, can undesirably snag objects with which they come into contact with. The creation of such snags in an inflatable air bag not only detrimentally effects the aesthetics of the system but, dependent upon the extent and location of the snag(s) could jeopardize the proper functioning of the system.

Thus, there are a number of U.S. patents that at least in part relate to cushion attachment and retaining mechanisms which avoid or reduce the use of or reliance upon fasteners such as rivets, bolts, and screws and, in turn, avoid or reduce the occurrence of the problems associated with the use of such fasteners.

For example, U.S. Pat. No. 4,941,678, Lauritzen et al., issued Jul. 17, 1990, discloses a lightweight housing canister assembly wherein notches formed on the inner side of each of the walls of the reaction canister body form a bag retaining ring shelf for retaining a continuous attachment ring formed at the gas inlet opening of the inflatable bag. Without the use of some sort of fastener, the retaining of such a continuous attachment ring onto the bag retaining shelf could pose a problem.

U.S. Pat. No. 4,986,569 discloses an air bag attachment system comprising a canister having a shoulder on a peripheral edge flange for seating of a metal rod disposed in a channel in the air bag. The edge flange of the canister is reentrantly folded about the rod to retain the air bag on the canister. Upon bag deployment, the reentrantly folded flange of the canister would appear susceptible to unfolding and to subsequent release of the metal rod disposed in the air bag channel. In addition, the edge of such a folded flange of the canister would appear to contact the air bag upon deployment thereof. As such an edge can form a relatively sharp edge surface, contact of the bag therewith could likely result in a tearing of the bag fabric and consequent failure by the system.

U.S. Pat. No. 5,069,480 though relying on the inclusion of a multiple number of fasteners, e.g., rivets "196", in securing an air bag to a retainer, discloses an air bag retainer assembly which includes a pillow or air bag assembly including a pillow retainer to which is attached an inflatable pillow or air bag and which retainer is secured to the reaction housing assembly. Gas, supplied upon activation of a gas generator, will flow through openings provided in the retainer and into the pillow or air bag. The air bag is secured to the retainer by means of both:

a) a fastener such as a rivet inserted within openings through the fabric of the air bag and into a corresponding opening in the retainer, and b) a V-shaped hem sewn about the end of the bag and which upon movement of the hem and air bag forward engages and envelopes the circumferential edge of the retainer.

U.S. Pat. No. 4,877,264 discloses the sewing into place, in the bag mouth, an elastomeric o-ring bead material. The bead material is configured and adapted to fit into a groove in the outer surface of a retainer ring. To effect engagement, the locking bead is stretched over a flanged upper lip portion of the retaining ring. The mouth of the bag is then permitted to contract back into the grooved portion of the ring.

Examples of other such patents include: U.S. Pat. No. 4,111,457 which discloses the use of a clamping ring to secure the edge of an air bag to the housing of the inflatable restraining device; and U.S. Pat. No. 5,058,919 which discloses an air bag module construction and assembly technique wherein a screen-shaped member is used to retain a folded air bag in the housing.

Thus, a relatively simple, low cost cushion attachment and retaining mechanism which: 1) avoids the use of fasteners such as rivets, bolts, and screws and the problems associated with the use of such fasteners, such as those identified herein and 2) which mechanism permits an easy adaptation to automated production and assembly is desired.

SUMMARY OF THE INVENTION

A general object of the invention is to provide an improved system and method for the attachment and retention of an air bag/cushion in a safety restraint system.

A more specific objective of the invention is to provide an improved inflatable restraint system utilizing such a system and/or method of air bag/cushion attachment and retention.

A still more specific objective of the invention is to overcome one or more of the problems described above.

The general object of the invention can be attained, at least in part, through a system for the attachment of an air bag to a reaction housing member. The system includes: a) an inflatable cushion having a thickened peripheral gas inlet opening; b) a cushion retainer having a channel portion for the securing therein of the thickened peripheral gas inlet opening to form a cushion/retainer subassembly wherein the secured gas inlet opening forms an attachment insert; and c) a reaction housing member comprising an attachment sleeve portion adapted for the insertion therein of said attachment insert to secure said cushion to said housing member.

The prior art fails to provide a simple, cost effective, and reliable means to attach a bag to a reaction can without the use of fasteners and the problems associated therewith. Most prior art attachment systems are not truly fastenerless and generally require secondary operations, typically involving extensive manual manipulation of module components and/or subassemblies, in order to complete the assembly process.

The invention further comprehends an air bag module subassembly including an inflatable cushion, a cushion retainer and a reaction housing member. The inflatable cushion includes a bead-containing thickened peripheral gas inlet opening while the cushion retainer includes a channel portion for the securing therein of the bead-containing thickened peripheral gas inlet opening to form a cushion/retainer subassembly. In such a cushion/retainer subassembly the secured gas inlet opening forms an attachment insert for insertion to and attachment with the reaction housing. The reaction housing member includes an attachment sleeve portion integrally formed therewith. The attachment sleeve portion being adapted for the insertion therein of the attachment insert to secure the cushion to the housing.

The invention still further comprehends a method for the fastenerless attachment of an inflatable cushion with a reaction housing member. The method includes the steps of:

a) securing a thickened peripheral gas inlet opening of an inflatable cushion in a channel portion of a cushion retainer to form a cushion/retainer subassembly, wherein the secured gas inlet opening forms a male mating member attachment insert; and b) inserting the male mating member attachment insert in a female mating sleeve portion of the reaction housing member to effect joinder of the subassembly with the reaction housing member.

The invention yet still further comprehends such a method for the fastenerless attachment of an inflatable cushion with a reaction housing member wherein:

a) the thickened peripheral gas inlet opening of the inflatable cushion contains a bead material and b) the reaction housing member is at least in part made of an extruded metal with the sleeve portion integrally formed therewith.

Other objects and advantages of the invention will be apparent to those skilled in the art from the following detailed description taken in conjunction with the appended claims and drawings.

BRIEF DESCRIPTION OF THE DRAWINGS

FIG. 4 is a simplified, partially exploded, fragmentary perspective view showing the joining together of the cushion/retainer subassembly and reaction housing in the air bag module subassembly shown in FIG. 1.

FIG. 5 is a simplified, partially exploded, fragmentary perspective view showing the joining together of a cushion/retainer subassembly and a reaction housing in accordance with an alternative embodiment of the invention.

FIG. 6 is a simplified enlarged cross sectional fragmentary view of a cushion retained by a housing in accordance with an embodiment of the invention.

For ease of illustration and discussion, like parts in the drawings are designated by the same reference numeral.

Also, component parts as are common in conventional module assemblies, including the inflator and the reaction housing portions, e.g., the housing side walls, associated with the securing of the inflator therein, are not shown as they do not form a part of the invention.

DETAILED DESCRIPTION OF THE INVENTION

The present invention, as is described in more detail below, provides improved cushion retention in inflatable restraint systems through a method and system of attachment of an inflatable cushion (e.g., an "air bag") to a reaction housing.

While the invention is described hereinafter with particular reference to a passenger side air bag module assembly for automotive vehicles including vans, pickup trucks, and particularly automobiles, it is to be understood that the invention also has applicability not only with other types or kinds of air bag module assemblies for automotive vehicles including driver side assemblies, but also with other types of vehicles including, for example, airplanes. With respect to automotive vehicles it will also be appreciated that due to usual physical differences between passenger and driver side air bag module assemblies, including the typical difference in size with passenger side air bags generally being much larger than those used in driver side assemblies, the invention is perceived to have particular initial utility in passenger side air bag module assemblies.

Figure 1:
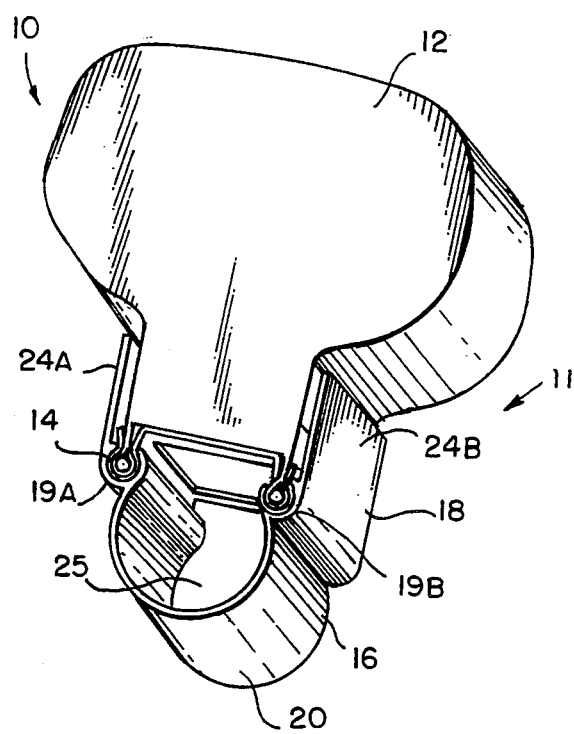
FIG. 1 is a simplified perspective view of air bag module subassembly showing an inflated cushion retained by a reaction housing in accordance with one embodiment of the invention.
Figure 2:
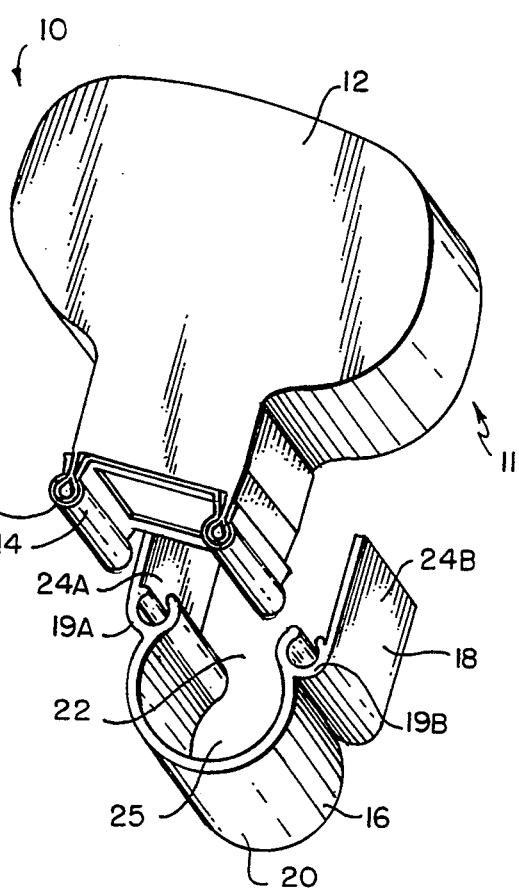
FIG. 2 is a simplified partially exploded perspective view of the air bag module subassembly of FIG. 1 showing the mode of insertion of the cushion/retainer subassembly with the reaction housing.

Referring to the drawings and initially referring particularly to FIGS. 1-4 and 6, there is illustrated an air bag module subassembly 10 (FIGS. 1 and 2). It is to be understood that in the practice of the invention, such an air bag module subassembly can form a component part of a complete module assembly such as are commonly housed in or secured to any appropriate cooperating portion of the vehicle. In the case of a passenger side module installation, such an assembly is normally housed in the instrument panel/dash board (not shown) of the vehicle opposite the passenger seat. In the case of a driver side module installation, such an assembly is typically housed in or secured to the steering wheel.

The subassembly 10 includes a cushion/retainer subassembly 11 including an inflatable cushion (e.g., an air bag) 12 and a retainer device 14. The module subassembly 10 further includes a reaction housing canister member 16 having a chute portion 18 with a rectangular cross sectional shape and, as shown in FIGS. 1-2 and 4, opening to two semi-hollow female attachment sleeve portions individually designated as 19A and 19B, respectively, an inflator housing portion 20, and a passageway portion 22 (FIG. 2).

The air bag 12 is shown in an inflated condition. Normally, the air bag 12 will be stored in an uninflated and folded condition within the reaction housing canister, such as in the chute portion 18. The chute portion 18 is shown (FIGS. 1-2) as formed by two opposed side walls individually designated as 24A and 24B, respectively.

The reaction housing canister member 16 serves to house an inflator (not shown) which upon proper actuation serves to provide gas with which the air bag is inflated. Typically the inflator will have a cylindrical shape and have a circular cross sectional shape. Thus, the inflator housing portion 20 includes a cavity 25 (FIGS. 1-2) having a circular cross sectional shape adapted for the securing therein of such an inflator. It is to be understood, however, that the shape and size of the inflator housing can be appropriately altered to be compatible with variously sized or shaped inflators. As the inflator and the parts associated therewith for the actuation of the inflator do not form a part of this invention, they will not be further described.

The attachment sleeve portions 19A and 19B are elongated key hole shaped grooves (see FIG. 4) provided at the forward end of inflator housing cavity 25 in association with the side walls 24A and 24B (see FIGS. 1-2). Referring to FIG. 4, the attachment sleeve portions 19A and 19B each include a slot 26 (individually designated as 26A and 26B, respectively), provided at the upper end thereof to allow the passage therethrough of the appropriately secured air bag. The attachment sleeve portions 19A and 19B preferably extend substantially the entire length of the reaction housing canister member 16, thereby providing an extended length of engagement between the housing member and the cushion/retainer subassembly 11. Such attachment sleeve portions can preferably be formed integrally with the reaction housing member as such integral formation of the attachment sleeve portions can avoid the need for additional attachment components and/or assembly steps and can thus be a generally very cost effective means of fabrication. It is to be understood, however, that the invention is not limited to use in conjunction with such integrally form attachment sleeves. Thus, the invention can also be practiced using attachment sleeves which are separately made and joined to the reaction housing, such as by welding the sleeve to the housing, for example.

The passageway portion 22 serves as a passageway for inflation gas from the inflator housed in the inflator housing portion 20 to the air bag 12.

Figure 3:
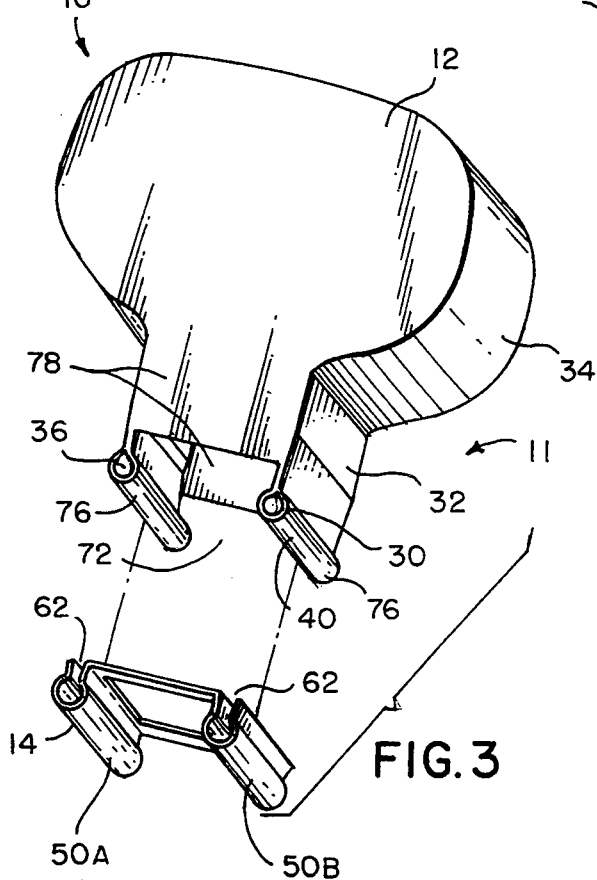
FIG. 3 is a simplified exploded perspective view of the retainer and cushion of the cushion/retainer subassembly of FIG. 2 showing the mode of insertion of the cushion with the retainer.

The air bag 12, as is common with the air bags used in such assemblies and as perhaps can most clearly be seen by reference to FIG. 3, includes a gas inlet opening portion 30, a throat portion 32 and a pillow portion 34. The gas inlet opening portion 30 provides a means through which inflation gas from the inflator enters the bag to effect inflation thereof. The throat portion 32 is that portion of the air bag 12 of reduced cross sectional area, as compared to the pillow portion 34, which generally fits within the chute portion of the housing upon deployment of the air bag. Thus, the throat portion 32 is typically sized to have, upon inflation, a cross sectional area slightly smaller than that of the chute portion of the canister. The pillow portion 34 is that portion of the air bag 12 which serves to pillow or cushion the passenger against contact with the front interior of the vehicle including, the dash board and the windshield, for example, in the event of actuation and deployment of the air bag 12.

As perhaps can most clearly be seen by reference to FIG. 3, the gas inlet opening portion 30 includes a thickened peripheral edge 36 about at least a portion thereof. Various modes of thickening the peripheral edge of at least selected sections of the gas inlet opening portion 30 are contemplated and include, for example, simply folding and hemming the gas inlet opening of the air bag over itself to form a loop or channel 40 into which a bead material 42 is placed.

While, it is of course to be understood that alternative means of edge thickening can be used without departing from the practice of the subject invention, the hemming of the bag gas inlet opening to form a loop into which a bead material is placed is a generally preferred thickening means because the use of such a thickening means tends to ensure positive engagement in the assembly. Furthermore, the bead material can be suitably fabricated from a wide range of materials such as various metals including, for example, steel or aluminum sections, e.g., such as steel or aluminum bars or tubes or, preferably, plastic, especially an extruded thermoplastic material such as nylon, for example. Also, the bead material preferably is continuous throughout the loop or channel sewn at the gas inlet opening of the air bag. The use of a continuous bead material helps facilitate the more equal distribution of the stresses accompanying bag deployment and the avoidance of undesired point loading of such stresses.

It is also to be understood that the bead material can take various shapes or forms to meet the needs of particular applications. For example, the bead material can take the form of a bar or rod and have a cross sectional shape, e.g., a circular or oval cross section, adapted to facilitate engagement with the retainer and in the assembly, particularly with the retainer. Another example of a bead material for use in the practice of the invention is the use of a fender welt shaped piece such as made of extruded plastic, for example.

The cushion retainer 14, shown in FIGS. 1-3 and more particularly shown in FIG. 4, includes generally parallel first and second channel portions 50 (individually identified as 50A and 50B, respectively). Each of the channel portions 50 includes opposed outer and inner side wall sections 52 and 54, respectively, (individually shown as outer side wall sections 52A and 52B, respectively, and inner side wall sections 54A and 54B, respectively). In addition, each of the channel portions 50 includes a bridging section 60 (shown individually as bridging sections 60A and 60B, respectively), which serve to bridge between the lower ends of each of the side walls 52 and 54, respectively. As shown in FIG. 3, for each channel portion 50, the upper ends of each of the outer and inner side wall sections, 52 and 54, respectively, are spaced apart forming a passageway 62 for the insertion therein of the thickened peripheral edge 36 of the air bag 12. In one preferred practice aspect of the invention it will be appreciated that, preceding the insertion of the thickened peripheral edge of the air bag therebetween, the upper ends of the outer and inner side wall sections can be beneficially spaced broadly apart to facilitate such later insertion. Subsequently, after the insertion of the thickened opening 36, the side walls 52 and 54, respectively, can be appropriately crimped together securing the air bag 12 therebetween and so as to form the cushion/retainer subassembly 11.

The so secured gas inlet opening 30 forms a male mating member attachment insert 70 (FIG. 2), facilitating the attachment or joinder thereof with the reaction housing member 16. As can be seen by reference to FIGS. 2 and 4, such a male mating attachment insert 70 can be inserted into the female mating sleeve portion 19A and 19B, thereby securing the cushion/retainer subassembly 11 to the reaction housing member 16 without the need for the use of fasteners such as conventional rivets, bolts, screws and the like.

As shown more particularly in FIGS. 3 and 4, the gas inlet opening portion 30 includes a gas inlet opening 72 having a generally rectangular cross sectional shape and including thickened peripheral edges on the two opposed longitudinal sides 76 of the rectangularly shaped opening 72 with the two opposed transverse sides 78 of the opening not being so thickened. Accordingly, the retainer device 14 is correspondingly shaped, with the thickened opposed longitudinal edges secured in channel portions 50 of the retainer 14. The retainer 14 includes two generally flat spacer sections 84 of material joining the channel portions 50 to each other at opposed ends. When using a retainer device which does not receive a thickened peripheral edge about the entire gas inlet opening of the air bag, the inclusion of one or more such spacer sections of material or the like bridging between the various channel portions will generally be preferred as such bridging section(s) serve to add structural strength to the retainer. In addition, such sections provide an interfacial barrier surface between the reaction housing and those portion of the bag opening not received within channel portions of the retainer. The inclusion of such an interfacial barrier can beneficially reduce the likelihood of damage to the air bag such as by undesirable contact with the inflator, for example.

It is to be understood, however, that the invention is not limited to practice with such a shaped retainer device. Thus, FIG. 5 illustrates a cushion/retainer subassembly (designated 11'). (In the embodiment illustrated in FIG. 5, like parts to the embodiment of FIGS. 1–4 and 6 are designated by the addition of a "'" to the reference numeral.) The subassembly 11' includes a section of an air bag 12' with the peripheral gas inlet opening 36' thereof appropriately thickened, e.g., with a loop 40' formed thereat and a bead material 42' inserted therein. The thickened opening is shown secured within a retainer device section 14' forming a male mating member attachment 70' for insertion into a female mating sleeve portion 19' of a reaction canister housing, e.g., member 16'. The female mating sleeve portion 19' includes a slot 26'. If desired, the entire gas inlet opening of an air bag can be appropriately thickened and the retainer device can be dimensioned and formed so that the channel portion extends about the entire opening. Other dimensions, shapes and forms for such retainer devices will be apparent to those skilled in the art from the teachings herein provided.

Typically, the cushion retainer will be fabricated from a ductile sheet material, typically a metal sheet material, such as steel or aluminum (either formed or extruded, for example), with steel, particularly low carbon steel, generally being preferred due to its relatively greater structural strength, ease of use and comparatively low cost. It is to be understood, however, that the cushion retainer of the invention can be fabricated of any suitable material, that is, the retainer can be made of any material capable of withstanding and properly operating under the conditions of use associated with such inflatable restraining systems including temperature, such as temperatures of up to about 1000° F., as can be realized with modules containing certain types of inflators.

In a particularly preferred method of fabrication, a single flat pattern of a selected material of construction, such as a sheet of steel or aluminum, for example, is used and by means of selectively bending and appropriately cutting or punching the metal sheet, the final form of the retainer device is achieved.

The retainer device of the invention functions to not only hold the peripheral gas inlet opening edge therein and thereby securing the entire air bag as well as to provide support to the inlet opening of the air bag but also to form a collar-like attachment about the thickened inlet opening and thus desirably prevent the so secured thickened edge from being pulled out through the sleeve slot, upon deployment of the air bag.

As described above, the invention may advantageously be practiced in conjunction with an extruded shaped reaction housing member. The fabrication of the housing member by extrusion is a preferred means of fabrication. Extrusion is an extremely versatile means of fabrication whereby functional appendages, such as mounting brackets as well as various attachment configurations, for example, can be incorporated into a member under fabrication at little or no additional cost or increase in production complexity. Further, extrusion processing allows for a smooth transition in the thickness of the parts or members under fabrication. The broader use of extrusion processing of materials such as aluminum is, however, limited by processing limitations including the desirability to realize practical lifetimes for the dies used in the extrusion and the formation of shapes able to maintain their shapes under the condition of use. For example, in the formation of an object like the above-described semi-hollow attachment sleeve portions, die life and shape integrity can detrimentally be effected when the slot forms an arc of less than about 60°.

On the other hand, a problem with the utilization of air bags with such a bead thickened peripheral opening in combination with such sleeve portions wherein the slot forms an arc of 60° or more is that such a sized slot arc opening is sufficiently wide that upon deployment of the air bag there is an ever present risk of the thickened edge being pulled out from the sleeve through the slot.

The retainer device of the present invention serves to restrict the dimension of the effective arc opening of the attachment sleeve, preventing pull out of the bead-thickened peripheral opening of the air bag through the attachment sleeve slot even with the use of attachment sleeve portions wherein the slot forms an arc opening of 60° or more. Thus, the invention helps to make practical the use of extrusion processing and specifically extrusion processing of a material such as aluminum, including the integral formation of attachment sleeve portions, despite such described processing limitations.

It is to be understood that reaction housing canisters typically also include end closures for such a reaction housing member. For example, two end plates bracketing such a housing canister member are a common type of end closure utilized in such module assembly designs. In addition, either as a part of the air bag module assembly or separately, a cover or a door is generally provided. Such a cover or door is generally designed to provide closure to the canister. In practice, such doors are typically made of plastic or a metal substrate with a plastic or other cover layer of material typically selected to match or be similar to the material of the outer surface of either the steering wheel (in the case of driver side assembly application) or, the instrument panel (e.g., in the case of a typical passenger side application). In order to facilitate illustration and comprehension of the invention, such end plates and cover are not shown in the drawings. Thus, the drawings illustrate only the main body portion of the reaction housing canister, e.g., the member 16.

While the practice of the invention in its broader aspects is not limited to use in conjunction with reaction canisters made of particular materials of construction, it is to be understood that because of a desire to practically reduce and/or minimize the cost and weight of the assembly, reaction canisters are typically made of steel or, preferably, aluminum either in a formed, cast or extruded shape. The use of aluminum is generally preferred as aluminum typically is only about one-third as dense as steel and thus permits the use of a double wall thickness of material (as compared to steel) while still realizing an overall weight savings in the assembly. Such a double wall thickness results in the can fabricated therewith having increased stiffness as well as greater structural integrity.

As described, the use of an extruded metal, e.g., aluminum, reaction canister is perceived as having particular beneficial aspects. It is to be further understood, however, that the construction of the reaction canister using other suitable materials of construction such as molded plastic, for example, are also contemplated.

It may be advantageous to include bend line perforations (not shown) along the channel portion in order to facilitate controlled bending of this portion of the retainer. Preferably, the bend line perforations, such as holes or slots, for example, are situated at or near the center and along the entire length of the bridging section of the channel portion so that the channel preferably remains generally circular in cross section after crimping, as described herein. Such bend line perforations can easily be created, such as by appropriately punching a sheet material used in the making of the retainer, for example. Such bend line perforations facilitate the crimping or pressing together of the outer flange and side wall, such as is preferably done during the assembly process, as will be described in more detail below.

In practice, an air bag (inflatable cushion) can typically be fabricated of a woven material such as coated or uncoated polyester, or polyamide fiber such as nylon 6 or nylon 6,6, for example. It is to be understood, however, that the practice of the invention is not limited to the use of air bags fabricated of any particular material or by any particular process.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. A system for the attachment of an inflatable cushion to a reaction housing member comprising:
   an inflatable cushion having a thickened peripheral gas inlet opening;
   a cushion retainer having a channel portion for the securing therein of said thickened peripheral gas inlet opening to form a cushion/retainer subassembly wherein said secured gas inlet opening forms an attachment insert; and
   a reaction housing member comprising an attachment sleeve portion adapted for the insertion therein of said attachment insert to secure said cushion to said housing.

2. The system of claim 1 wherein said thickened peripheral gas inlet opening comprises a loop formed at said opening wherein a bead material is placed.

3. The system of claim 2 wherein said bead material comprises a section having a cross sectional shape adapted to facilitate engagement with said retainer, said bead material being continuous throughout said loop.

4. The system of claim 1 wherein said reaction housing member comprises an extruded material with said attachment sleeve portion being integrally formed therewith.

5. The system of claim 4 wherein said extruded material comprises aluminum.

6. A system for the attachment of an inflatable cushion to a reaction housing member comprising:
   an inflatable cushion having a thickened peripheral gas inlet opening;
   a cushion retainer having a channel portion for the securing therein of said thickened peripheral gas inlet opening to form a cushion/retainer subassembly wherein said secured gas inlet opening forms an attachment insert, wherein said retainer comprises first and second channel portions joined together by at least one spacer section; and
   a reaction housing member comprising an attachment sleeve portion adapted for the insertion therein of said attachment insert to secure said cushion to said housing.

7. The system of claim 6 wherein said first and second channel portions are generally parallel to each other and are joined together at opposed ends by at least two of said spacer sections.

8. An air bag module subassembly comprising:
   an inflatable cushion having a bead-containing thickened peripheral gas inlet opening;
   a cushion retainer fabricated of a metal material having a channel portion for the securing therein of said bead-containing thickened peripheral gas inlet opening to form a cushion/retainer subassembly wherein said secured gas inlet opening forms an attachment insert; and
   a reaction housing member of extruded metal and having an attachment sleeve portion integrally formed therewith, said attachment sleeve portion being adapted for the insertion therein
   of said attachment insert to secure said cushion to said housing.

9. The subassembly of claim 8 wherein said bead comprises a section having a cross sectional shape adapted to facilitate engagement with said retainer and being continuous throughout said loop.

10. The subassembly of claim 8 wherein said extruded metal comprises aluminum.

11. A method for the fastenerless attachment of an inflatable cushion with a reaction housing member, said method comprising the steps of:
    securing a thickened peripheral gas inlet opening of an inflatable cushion in a channel portion of a cushion retainer to form a cushion/retainer subassembly wherein said secured gas inlet opening forms a male mating member attachment insert; and
    inserting said male mating member attachment insert in a female mating sleeve portion of the reaction housing member to effect joinder of said subassembly with said reaction housing member.

12. The method of claim 11 wherein said thickened peripheral gas inlet opening is made by:
    forming a loop of the cushion material at said inlet opening of said cushion, said loop being adapted for the insertion therein of a bead material, and
    inserting a bead material into said loop.

13. The method of claim 11 wherein said securing step comprises the steps of:

inserting said thickened peripheral gas inlet opening through a passageway formed between inner and outer side wall sections of the channel portion and crimping said inner and outer side wall sections together with said thickened peripheral gas inlet opening therebetween to effect said securing.

14. The method of claim 11 wherein said retainer comprises first and second channel portions joined together by at least one spacer section, wherein said securing step comprises the steps of:

inserting a first portion of said thickened peripheral gas inlet opening through a passageway formed between inner and outer side wall sections in the first channel portion, inserting a second portion of said thickened peripheral gas inlet opening through a passageway formed between inner and outer side wall sections in the second channel portion, and crimping said inner and outer side wall sections in each of said first and second channel portions together with said first and second portions, respectively, of said thickened peripheral gas inlet opening therebetween to effect said securing.

15. The method of claim 11 wherein said reaction housing member comprises an extruded material with said attachment sleeve portion being integrally formed therewith.

16. The method of claim 15 wherein said extruded material comprises aluminum.

17. A method for the fastenerless attachment of an inflatable cushion with a reaction housing member, said method comprising the steps of:

securing a bead-containing thickened peripheral gas inlet opening of an inflatable cushion in a channel portion of a cushion retainer fabricated of a metal material to form a cushion/retainer subassembly wherein said secured gas inlet opening forms a male mating member attachment insert; and inserting said male mating member attachment insert in an integrally formed female mating sleeve portion of an extruded metal reaction housing member to effect joinder of said subassembly with said reaction housing member.

18. The method of claim 17 wherein said securing step comprises the steps of:

inserting said thickened peripheral gas inlet opening through a passageway formed between inner and outer side wall sections of the channel portion and crimping said inner and outer side wall sections together with said thickened peripheral gas inlet opening therebetween to effect said securing.

19. The method of claim 17 wherein said retainer comprises first and second channel portions joined together by at least one spacer section, wherein said securing step comprises the steps of:

inserting a first portion of said thickened peripheral gas inlet opening through a passageway formed between inner and outer side wall sections in the first channel portion, inserting a second portion of said thickened peripheral gas inlet opening through a passageway formed between inner and outer side wall sections in the second channel portion, and crimping said inner and outer side wall sections in each of said first and second channel portions together with said first and second portions, respectively, of said thickened peripheral gas inlet opening therebetween to effect said securing.

20. The method of claim 17 wherein said extruded metal comprises aluminum.

* * * * *